(12) United States Patent
Jones et al.

(10) Patent No.: US 11,368,525 B2
(45) Date of Patent: Jun. 21, 2022

(54) RELAYING NETWORK MANAGEMENT TASKS USING A MULTI-SERVICE RECEPTOR NETWORK

(71) Applicant: Red Hat, Inc., Raleigh, NC (US)

(72) Inventors: Matthew Jones, Durham, NC (US); Joshua Ginsberg, Raleigh, NC (US); Jesse Jaggars, Little Rock, AR (US)

(73) Assignee: Red Hat, Inc., Raleigh, NC (US)

( * ) Notice: Subject to any disclaimer, the term of this patent is extended or adjusted under 35 U.S.C. 154(b) by 58 days.

(21) Appl. No.: 16/700,996

(22) Filed: Dec. 2, 2019

(65) Prior Publication Data
US 2021/0168197 A1 Jun. 3, 2021

(51) Int. Cl.
| | | |
|---|---|---|
| *G06F 15/173* | (2006.01) | |
| *H04L 67/101* | (2022.01) | |
| *H04L 45/745* | (2022.01) | |
| *H04L 45/12* | (2022.01) | |

(52) U.S. Cl.
CPC .......... *H04L 67/101* (2013.01); *H04L 45/123* (2013.01); *H04L 45/745* (2013.01)

(58) Field of Classification Search
CPC .... H04L 67/101; H04L 45/123; H04L 45/745
See application file for complete search history.

(56) References Cited

U.S. PATENT DOCUMENTS 9,368,026 B1 * 6/2016 Herbach ................ G08G 1/202
10,142,847 B2 11/2018 Vanderveen et al.

2014/0173133 A1 * 6/2014 Ammireddy ............ H04L 45/12
709/241
2014/0201511 A1 * 7/2014 Shutt ...................... G06F 9/4416
713/2
2014/0219275 A1 * 8/2014 Allan ...................... H04L 45/745
370/390

(Continued)

FOREIGN PATENT DOCUMENTS

| ES | 2374115 T3 | 2/2012 |
|---|---|---|
| WO | 2019099111 A1 | 5/2019 |

OTHER PUBLICATIONS

Huawei Huang; et al., "Software-Defined Wireless Mesh Networks: Architecture and Traffic Orchestration", University of Aizu; University of Waterloo, Jul. 2015, pp. 24-30.

(Continued)

*Primary Examiner* — Thanh T Nguyen
(74) *Attorney, Agent, or Firm* — Womble Bond Dickinson (US) LLP (57) ABSTRACT

In some implementations, a method is provided. The method includes receiving at an origin controller node, a task and determining a destination work node where the task is to be executed, wherein the origin controller node and the destination work node each comprise a receptor node among a plurality of receptor nodes forming a receptor network, and each of the plurality of receptor nodes functions as one or more of a router node, a controller node, and a work node. The method further includes determining a first router node comprising a first hop on an optimal path to the destination work node, the first router node determined from among a set of receptor nodes functioning at least as router nodes. The method further includes transmitting the task to the destination work node via the first router node and performing the task via the destination work node.

20 Claims, 7 Drawing Sheets

(56) References Cited

U.S. PATENT DOCUMENTS

2018/0309636 A1 10/2018 Strom et al.
2021/0073047 A1* 3/2021 Bhandaru ........... H04L 41/0893

OTHER PUBLICATIONS

"Orchestrating Microservices and Multi-Container Applications for High Scalability and Availability", Microsoft, Sep. 20, 2018, pp. 1-9.
Alexander Zimmermann; et al., "How to Study Wireless Mesh Networks: A Hybrid Testbed Approach", Department of Computer Science, Informatik 4 RWTH Aachen University, Ahornstr. Aachen Germany, 2007, pp. 1-8.

* cited by examiner

RELAYING NETWORK MANAGEMENT TASKS USING A MULTI-SERVICE RECEPTOR NETWORK

BACKGROUND

A network or data center may include a number of components network devices, computing devices, containers, virtual machines, and applications etc.) capable of communicating data with other devices through a wired or wireless connection or set of connections. For example, a network device may receive data from a first device (e.g., a first computing device, a first switch, a first router, etc.) and may forward the data to a second device (e.g., a second computing device, a second switch, a second router, etc.). A computing device of a network may host one or more resources (e.g., applications, web sites, data storage etc.) to perform various functions and tasks. Such resources are often times accessed by other network components (e.g., other applications or computing devices). Certain components in a network may often communicate with hosted services outside the network that perform various network management functions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Hosted services often need to orchestrate or automate services that cross between complex network topologies in a client's network, where connection patterns can be non-uniform. In addition, such network boundaries are sometimes unreliable or transient, rendering traditional direct-connection or message-bus oriented approaches difficult to implement. For example, certain cloud based hosted services may want to manage the infrastructure within a client network by e.g., modifying the client network in a trusted way. However, client networks may have security policies that do not allow modification except by trusted parties, or only allow certain modification privileges by cloud based hosted services. In addition, client networks are often segmented into multiple security zones, where traffic from one security zone may not be trusted across other security zones. Thus, if (for example) an automation system is deployed in a Red Hat™ cloud service, then it cannot connect to the client's network (or, if it can, it cannot connect to a protected zone of the network where services need to be provided) unless there is an application deployed on the client's network that reaches out and establishes the connection to the automation system. This application can then reach into a protected zone to access a destination location. However, many such network management solutions are ad hoc, and can only cover a single security zone traversal, and/or can traverse security zones for only a single type of management activity.

In addition, current network management solutions have trouble managing multiple components of customer networks, particularly when they are spread out across multiple data centers and/or geographical locations. Such solutions may be unable to communicate with various network components owing to different deployment strategies, security policies, and ingress patterns into security zones. Further, such solutions cannot compensate for failures anywhere in the network topology, for example by finding multiple routes to a particular location on a client network.

Aspects of the present disclosure address the above noted and other deficiencies by implementing a receptor network for forwarding a message received from a hosted service external to the receptor network (also referred to as an external service) to a destination work node in the receptor network that can execute the task. The message may include a task to be performed, such as a network management function, for example. The receptor network may comprise a plurality of receptor nodes that each may function as one or more of a router node, a controller node, and a work node. Each of the plurality of receptor nodes may include a bi-directional link to one or more other receptor nodes. The message may be received (e.g., from an external service) at an origin controller node which may determine a destination work node(s) that have a plugin that can execute the task. The origin controller node and the destination work node may each comprise a receptor node in the receptor network. A first router node comprising a first hop on an optimal path to the destination work node may be determined, the first router node determined from among a set of receptor nodes functioning at least as router nodes. The task may be transmitted to the destination work node via the first router node and the task may be performed by a plugin on the destination work node.

Figure 1A:
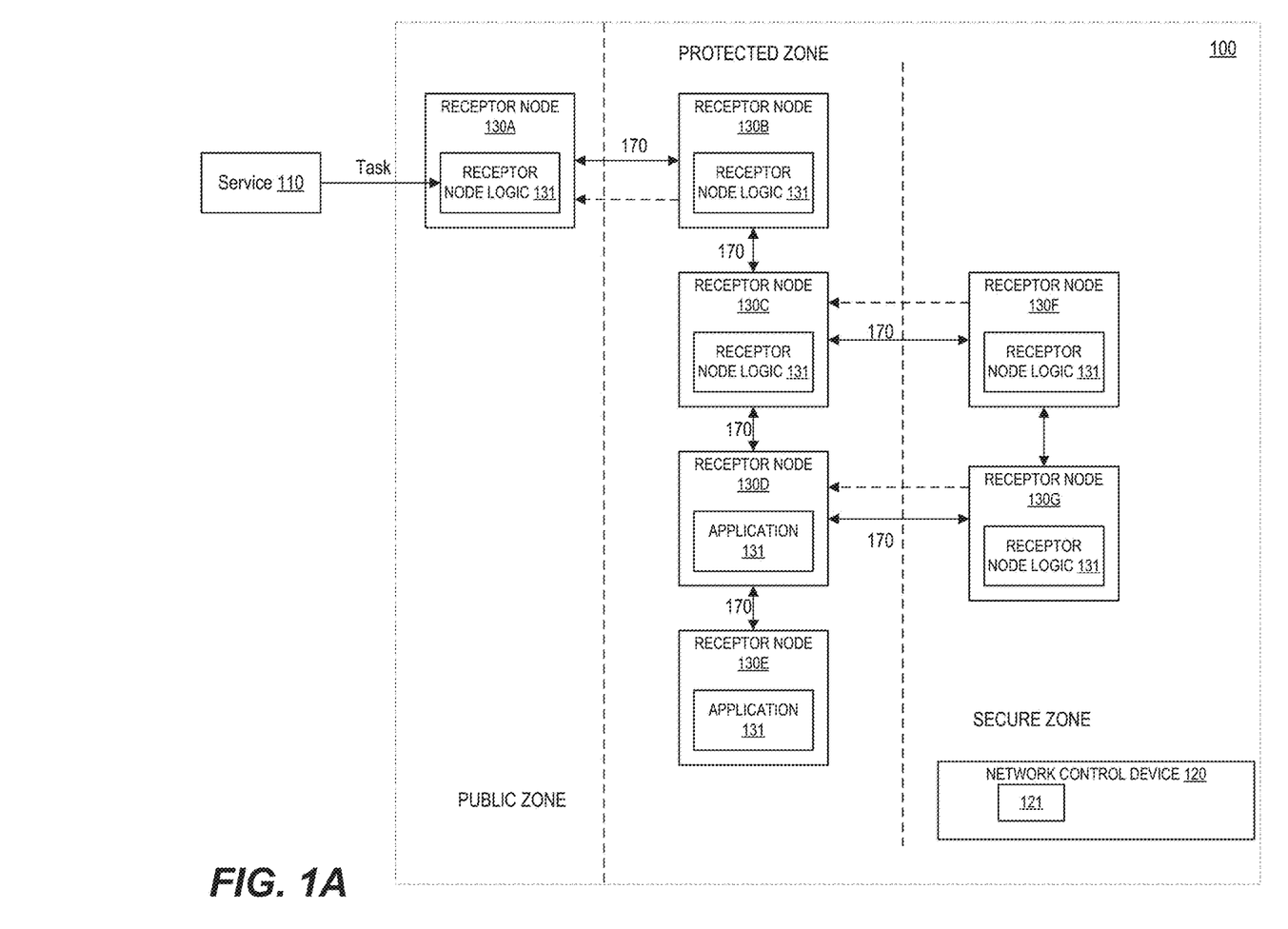
FIG. 1A is a block diagram illustrating an example of a receptor network, in accordance with some embodiments of the present disclosure.

FIG. 1A is a block diagram that illustrates an example receptor network 100, in accordance with some embodiments of the present disclosure. As illustrated in FIG. 1A, the receptor network 100 may include a plurality of receptor nodes 130A-130G (also referred to as "nodes") and a network control device 120. Each receptor node 130 may comprise receptor node logic 131 and may run on any appropriate network component (e.g., network device, computing device, container, virtual machine (VM), etc.). One or more receptor nodes 130 may run on the same network component or across one or more different network components. In addition, one or more receptor nodes 130 may run as a stand-alone service on any network component, or may run on any network component alongside other network services (e.g., may share a host network component with other network services). Further, one or more receptor nodes 130 may run as part of another network service installed on any network component. In one example, receptor node 130D may run ore a dedicated VM or container on a host device (that may or may not have other VMs or containers with other receptor nodes 130 and/or other network services running on them). The receptor nodes 130 may be coupled to each other (e.g., may be operatively coupled, communicatively coupled, may communicate data/messages (e.g., network management tasks to be performed) with each other) as part of receptor network 100. Receptor network 100 may be a public network (e.g., the internet), private network (e.g. a local area network (LAN) or wide area network (WAN)), or a combination thereof. In some embodiments, receptor network 100 may include a wired or a wireless infrastructure, which may be provided by one or more wireless communications systems, such as a WiFi hotspot connected with the receptor network 100 and/or a wireless carrier system that can be implemented using various data processing equipment, communication towers (e.g. cell towers), etc. The receptor network 100 may also include various components such as switches, routers, bridges, gateways, servers, computers, cables, chips integrated circuits, etc. (not shown in the figures). The receptor network 100 may carry communications (e.g., data, messages, frames, etc.) between receptor nodes 130 and any other components of receptor network 100.

In some embodiments, one or more receptor nodes 130 may be implemented on a computing device that includes hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, laptop computers, tablet computers, smartphones, set-top boxes, etc. In some examples, a computing device may be a single machine or may include multiple interconnected machines (e.g., multiple computers configured in a cluster). The computing device(s) may be implemented by a common entity/organization or may be implemented by different entities/organizations.

In some embodiments, one or more receptor nodes 130 may be implemented on a virtual machine (VM). A VM may be an emulation of a computing device. The VM may execute on a hypervisor which executes on top of an operating system for a host computing device. The hypervisor may manage system resources (e.g., may manage access to hardware devices, such as processors, memories, storage devices, etc., of the host computing device). The hypervisor may also emulate the hardware (or other physical resources) which may be used by the VMs to execute software and/or applications (e.g., a receptor node 130). One or more receptor nodes 130 may also be implemented using one or more containers executing on a host computing device. A container may be an isolated set of resources allocated to executing logic, an application, software, and/or process (e.g., a receptor node 130) independent from other logic, applications, software, and/or processes executing on the host computing device. The operating system (OS) of the host computing device may use namespaces to isolate the resources of the containers from each other. In some embodiments, a container may be a virtualized object similar to a VM. However, a container may not implement a separate guest OS (like a VM). The container may share the kernel, libraries, and binaries of the OS of the host computing device with other containers that are executing on the same computing device. For example, receptor nodes 130C and 130D may both be implemented on containers executing on the same host computing device. Each container may have one or more respective file systems, memories, devices, network ports, etc., for accessing the physical resources of the host computing device.

The receptor network 100 may be divided into a number of zones as illustrated in FIG. 1A. More specifically, receptor network 100 may include a public zone, a protected zone, and a secure zone. These zones may each be defined by a particular security policy implemented by the network administrator, for example. For example, a public zone may represent a low security area of the receptor network 100. Nodes in the public zone may not be allowed to initiate connections with nodes in any zone except the public zone, however nodes from other zones may initiate connections with nodes in the public zone. A protected zone may represent a medium security area of the receptor network 100 where nodes in the public zone may not initiate communications with nodes in the protected zone, but nodes in the protected zone may initiate connections with nodes in the public zone. A secure zone may represent a high security area of the receptor network 100 where nodes in the public and protected zones may not initiate communications with nodes in the secure zone, but nodes in the secure zone may initiate connections with nodes in the protected zone, or in some embodiments, nodes in the protected zone as well as nodes in the public zone, as discussed in further detail herein.

The network control device 120 (hereinafter device 120) may include receptor node management logic 121 which may enable device 120 to function to monitor the receptor network 100 and create or remove receptor nodes 130. When device 120 creates a receptor node 130 (e.g., node 130A), it may provision it with receptor node logic 131, which may include server functionality in order to listen for connection requests from other receptor nodes 130 as well as peer connection functionality to initiate and form direct connections to peer nodes (as specified by device 121). During creation of the receptor node 130A for example, device 120 may generate a configuration file for the node in which it may specify certain peer receptor nodes 130 with which the receptor node 130A is to initiate and form a bi-directional connection 170. These peer receptor nodes may be nodes in security zones that do not allow them to initiate connection with receptor node 130A, for example. The bi-directional connection 170 may be a raw socket connection, an HTTP connection, or any other appropriate connection type. Device 120 may also include in the configuration file, a port and address of the receptor node 130A on which the server functionality will be implemented in order to listen for requests to connect (e.g., form a bi-directional connection) from other receptor nodes 130 and accept such connections from other receptor nodes 130 which may be in security zones that receptor node 130A does not have permission to initiate connections with. Thus, each receptor node 130 may act in a push and/or pull manner, by directly forming connections with peer nodes (push) and/or accepting incoming connection requests from other nodes (pull).

In this way, receptor nodes 130 that are located in a secure zone of the receptor network 100 that allows only outbound initiation of communication may be configured on start up to establish a peer connection with receptor nodes 130 that are outside the secure zone, as receptor nodes outside the secure zone cannot initiate requests to connect to nodes within the secure zone. It should be noted that each individual receptor node pair may negotiate their connection (if any) individually, and independent of other receptor nodes not involved in the connection. If a connection initiated by a receptor node 130 is lost, that receptor node 130 may attempt to reestablish it. For example, if receptor node 130G initiates and establishes a connection with receptor node 130E (e.g., receptor node 130E is a peer node in receptor node 130G's configuration file), and the connection is subsequently lost, receptor node 130G may automatically attempt to reestablish the connection, but receptor node 130E may not. The bi-directional connections 170 between receptor nodes 130 are illustrated in FIG. 1A which also illustrates (with dashed lines) the direction in which the connections are formed (with the arrow pointing to the device that received the connection request). As discussed in further detail herein, the receptor nodes 130 may work together to direct messages (including e.g., tasks) to their intended destination.

Network control device 120 may also provision each receptor node 130 with a routing table and a node identifier (ID) that is separate from any other identifying characteristic of the underlying host (e.g., host name, internet protocol (IP) address) since multiple receptor nodes 130 can run on the same host (e.g., as multiple services running on the same VM or host computing device). The routing table may include the node ID of other receptor nodes 130 and their location in the receptor network 100 so as to provide information about the topology of the receptor network for each receptor node 130. Each receptor node 130 may utilize its routing table to transmit a message to a determined next receptor node (hop). As receptor nodes are created or leave the receptor network 100, each receptor node 130 may update its routing table accordingly.

Device 120 may create a receptor node 130 as a standalone service on any appropriate network component (e.g., network device, computing device, container, virtual machine, etc.) or alongside or as part of another service installed on any appropriate network component. Device 120 may account for the different security zones when creating and configuring receptor nodes 130 in order to ensure that multiple pathways exist from the public zone to the secure zone. In some embodiments, device 120 may monitor the receptor network 100 and determine where nodes and connections are needed in the network. For example, if there is only a single path from receptor node 130A to receptor node 130G (e.g., due to a failure of another receptor node 130F) which is experiencing high levels of traffic resulting in a bottleneck, device 120 may create one or more additional receptor nodes and specify in their configuration files which receptor node(s) they should form connections with in order to create additional pathways and alleviate the bottleneck. In this way, receptor network 100 may comprise a flexible multi-service relayer with remote execution and orchestration capabilities, as discussed in further detail herein.

Figure 2:
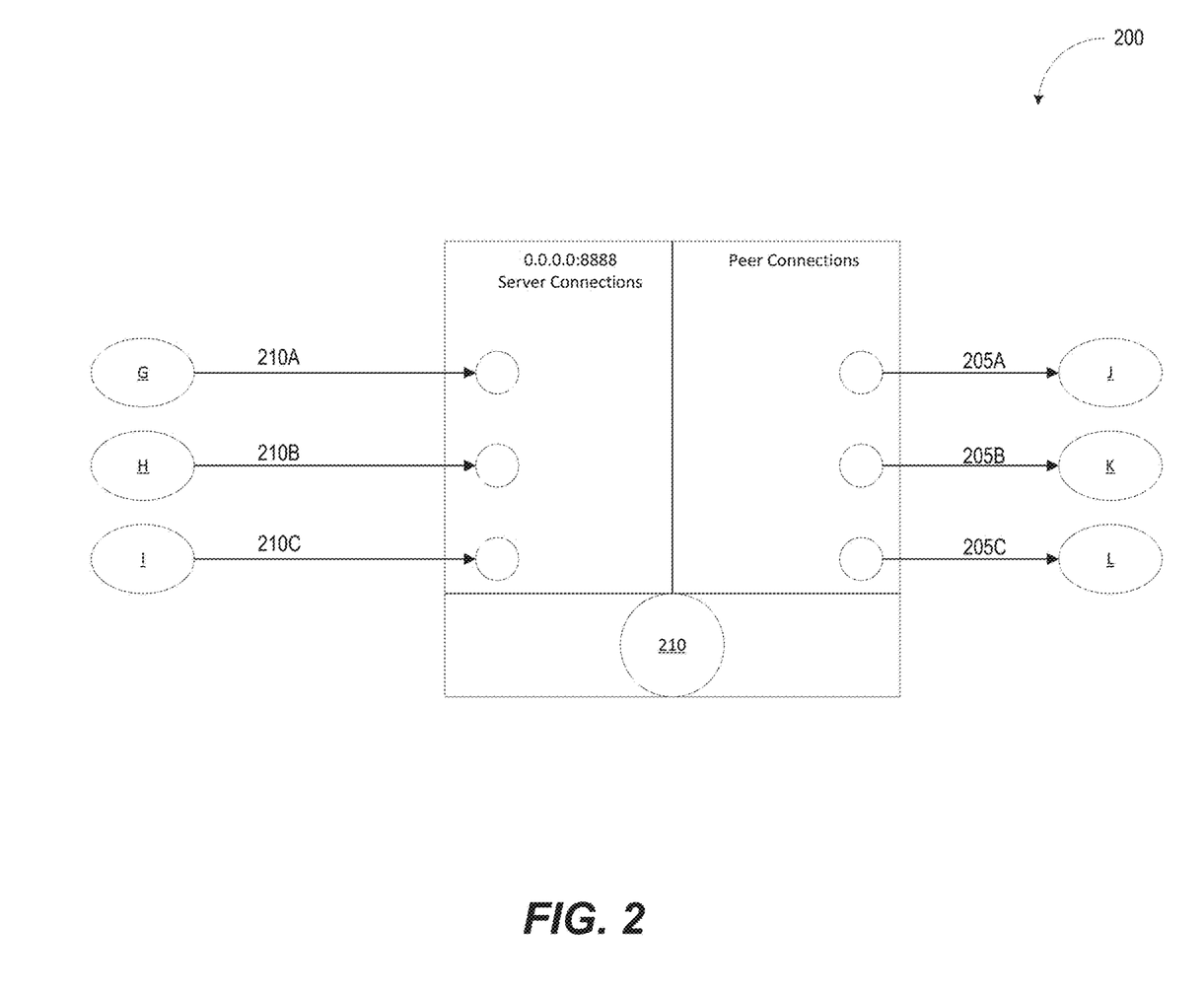
FIG. 2 is a diagram of an example controller node, in accordance with some embodiments of the present disclosure.

Logic 131 may further allow a receptor node 130 to function as one or more of a controller node, a router node, and/or a work node. A controller node may expose an interface on a port that allows external services (e.g., service 110) that are external to the receptor network 100 to communicate with the receptor network 100 in order to distribute messages that include tasks to work nodes and receive status indicators and the output of execution of those tasks. It should be noted that in order to function as a controller node, a receptor node must be designated as such when it is created (e.g., in its configuration file). Service 110 may be any service that wishes to orchestrate or automate tasks within receptor network 100, such as the Red Hat™ Ansible™ engine. A task may refer to any appropriate general computing or network function (including translation of a task into an action that can be performed by another platform (e.g., an Openshift server)). Examples of tasks may include provisioning of cloud infrastructure (e.g., virtualized hosts and hypervisors), network configuration management functions, network monitoring and security functions (e.g., applying security policies), application deployment orchestration, automation requests (e.g., to install a web server on a work node), a request to run a script, a request to hit a particular endpoint, or any other appropriate network or general computing function. When service 110 transmits a message including a task to be completed to a controller node, the controller node may analyze the type of task and determine a work node or group of work nodes capable of executing the task based on plugin information advertised by each work node. The plugin information may indicate what plugins (and thus, capabilities) the particular work node includes. The controller node may transmit the message to the determined work node(s) as discussed in further detail herein. FIG. 2 illustrates a controller node 200 in accordance with some embodiments of the present disclosure. Controller node 200 may include a local Unix socket path interface 210 that it may use to interface/connect to external services (e.g., service 110) which may want to transmit tasks into the receptor network 100. Controller node 200 may also include peer connections 205A-205C and server connections 210A-210C to other receptor nodes G L. Controller node 200 may reside in a public zone of the receptor network 100, for example, and thus may form peer connections (e.g., connections that it initiates) with other receptor nodes J-L that are also in the public zone due to being unable to initiate connections with receptor nodes in the protected or secure zones. The controller node 200 may also have server functionality to listen for and accept connections 210A-210C from other receptor nodes G-I, which may be in the protected and/or secured zones where controller node 200 is unable to initiate connection requests. Controller node 200 may send messages (including e.g., tasks) received from external services into the receptor network 100 in order to be executed by receptor nodes functioning as work nodes as discussed in further detail herein. It should be noted that this function of interfacing with external services is exclusive to controller nodes.

A router node may manage connections between receptor nodes. Router nodes may direct traffic (e.g., messages containing tasks) to its intended destination as discussed in further detail herein. Each router node may be configured to form a direct connection with one or more receptor nodes identified as peer nodes in the router node's configuration file, and accept connections from one or more receptors nodes based on its configuration file as discussed in further detail herein. In this way, router nodes may form a mesh that links controller nodes with work nodes that can perform tasks.

Work nodes are nodes that have been configured to perform tasks. Work nodes may include plugins that may execute tasks that are directed to them (e.g., by a controller node and one or more router nodes) and respond with status indicators and results of performing the task. Stated differently, the receptor network 100 may act as a means to deliver a task from a service external to the receptor network 100 to a plugin on a work node, Each plugin may comprise a package that is installed on the work node (e.g., by device 120 when creating the work node or anytime thereafter). A work node may include various plugins, each of which may match a particular task type. Upon receiving a message with a task, a work node may inspect the message payload and determine a plugin that matches the task type and can thus perform the task. The work node may start the determined plugin and provide the task data from the message to the plugin, as well as deliver status indicators and the resulting output of performing the task to the controller node via the router nodes as discussed in further detail herein. Once installed, a plugin may inform the receptor network 100 about its capabilities and may provide any extra metadata that may aid the receptor network 100 in routing work to it. Such information may be automatically broadcast to the entire receptor network 100. It should be noted that while some plugins may contain logic for performing a task at the work node itself; other plugins may contain logic for translating the task request into an action to be performed on another platform (e.g., an Openshift server) and transmitting the action to the other platform to be performed.

It should be noted that although the functionality of control nodes, router nodes, and/or work nodes have been described, a receptor node 130 is not limited to a single node type, and may function as one or more of these depending on, for example, its location in the receptor network 100, the number of plugins it has, the number of connections it has to other receptor nodes, and its configuration file (discussed above). However, in order to function as a controller node, a receptor node must be designated as such when it is created (e.g., in its configuration file).

Figure 3:
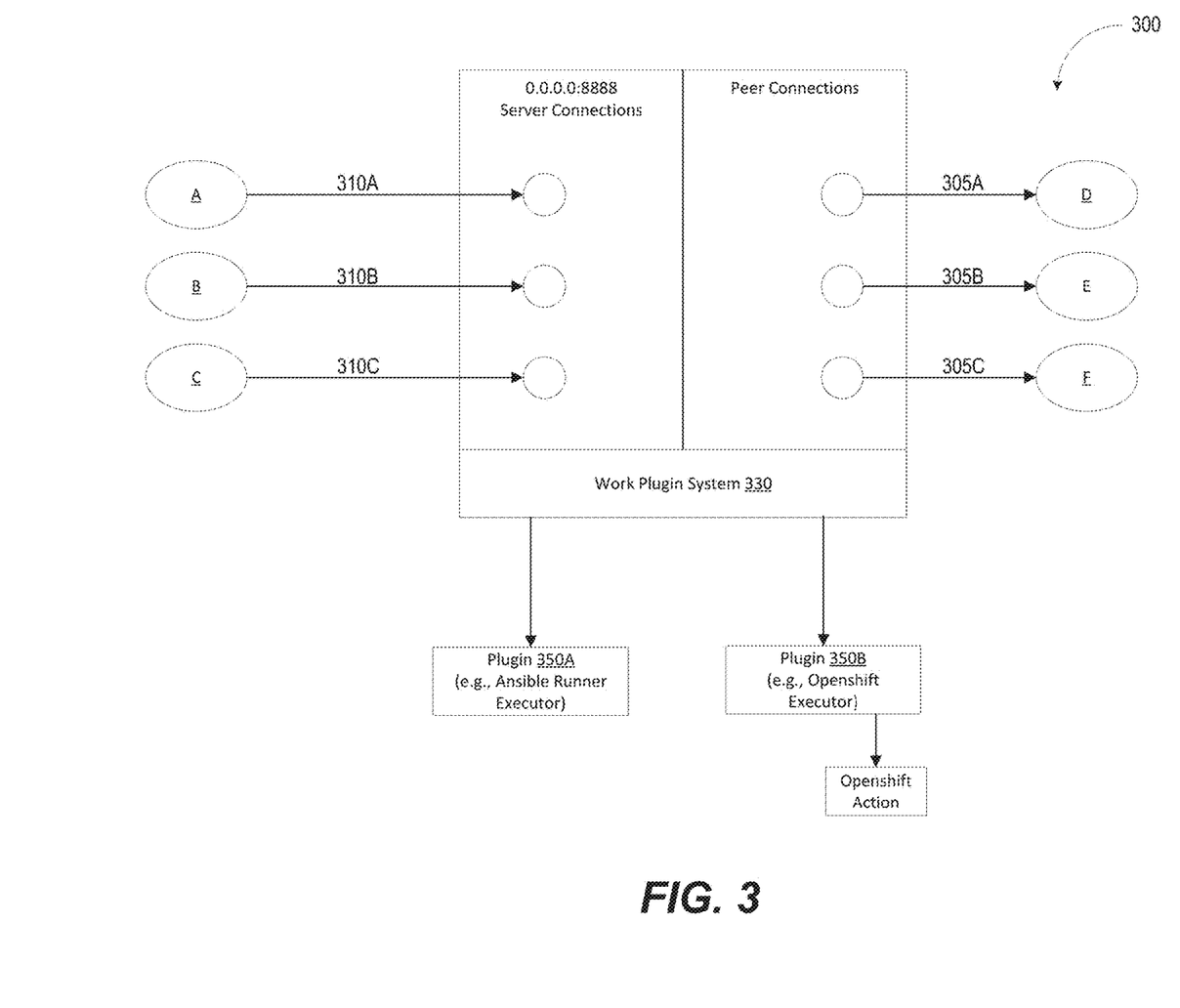
FIG. 3 is a diagram of an example work node, in accordance with some embodiments of the present disclosure.

FIG. 3 illustrates a work node 300 in accordance with some embodiments of the present disclosure. Work node 300 may include peer connections 305A-305C, server connections 310A-310C, and plugins 350A and 350B. As discussed above, peer connections 305A 305C represent connections to other receptor nodes D-F that the work node 300 is configured to initiate by device 120 when it provisions work node 300. A peer connection 305 may represent a connection with a receptor node D-F that work node 300 may initiate communication with, but the receptor node D-F cannot initiate communication with work node 300 due to work node 300 being located in the protected zone and the receptor node D-F being located in the public zone, for example. This is indicated by the directional arrow of peer connections 305 indicating the direction in which connection may be initiated. A server connection 310 may represent a connection with a receptor node A-C that is initiated by the receptor node A-C but that work node 300 may not initiate communication with, due to the receptor node A-C being located in the secured zone, for example. This is indicated by the directional arrow of server connections 310 indicating the direction in which connection may be initiated.

Thus, in the example of FIG. 3, the configuration file of work node 300 may indicate that the server function is to be started at port 0.0.0.0:8888 (e.g., to wait for communication requests from receptor nodes A-C), and simultaneously that connections are to be established with (e.g., by sending communication requests to) peer receptor nodes D-F on their respective server function ports. As discussed above, the connections (whether peer or serve between work node 300 and receptor nodes A-F may all be the same type (e.g., bi-directional connection 170).

Work node 300 may include work plugin logic 330 (e.g., part of the receptor node logic 131) which may enable the work node 300 to, upon receiving a message with a task, inspect the message payload and determine a matching plugin that can perform the task. The work node 300 may start the matching plugin and provide the task data from the message to the plugin. For example, work node 300 may receive a message with a task requiring an action to be taken on an Openshift platform, determine that plugin 350B is an Openshift executor and matches the task, and provide the task data to the plugin 350B.

Work node 300 may include plugins 350A and 350B that enable it to perform one or more tasks. As discussed above, each plugin may comprise a package that is installed on the work node 300 at the time of its creation, or any time thereafter by a user/network administrator. In the example of FIG. 3, plugin 350A may be an Ansible™ inner executor plugin which is capable of performing tasks directed to it such as automation requests (from e.g., service 110), for example. Plugin 350B may be an Openshift executor plugin, that is separate from an Openshift server. Because plugin 350B is not part of an Openshift platform, it may function to translate tasks that are directed to it into an action that can be performed by an Openshift platform and transmit the action to the Openshift platform. Each plugin 350 may inform the receptor network 100 about its capabilities, as discussed above.

As discussed above, a receptor node 130 may function as one or more of a control node, router node, and/or work node depending on, for example, its location in the receptor network 100, the number of plugins it has, the number of connections it has to other receptor nodes 130, and its configuration file (discussed above). However, in order to function as a controller node, a receptor node must be designated as such when it is created. Referring back to FIG. 1A, if a receptor node 130E is located at the edge of the receptor network 100, and does not have many connections to other receptor nodes (and therefore cannot facilitate a message forwarding function), it may function primarily as a work node. However, if a sufficient number of other receptor nodes 130 form connections with it at a later time, it may then act as both a router node and a work node. In another example, if receptor node 130E is provisioned with a number of plugins at creation time, then it may function as a work node, as well as a router node (if it forms connections with other nodes) which can relay messages to other router nodes and/or work nodes. If the plugins on the receptor node 130E are uninstalled, then the receptor node 130E may function solely as a router node.

Receptor network 100 and each receptor node 130 may be agnostic to the type of messages/data being communicated across it, and may be extensible with various different types of messages, applications, plugins, automation playbooks, and instructions, among others. Receptor network 100 may also be modular, and receptor nodes 130 may be created, removed, or temporarily brought offline when deemed necessary by the network control device 120. In addition, receptor nodes that include plugins may have certain plugins uninstalled, or additional plugins installed as determined by the network control device 120. Thus, the receptor network 100 may support a large variety of task types.

Figure 1B:
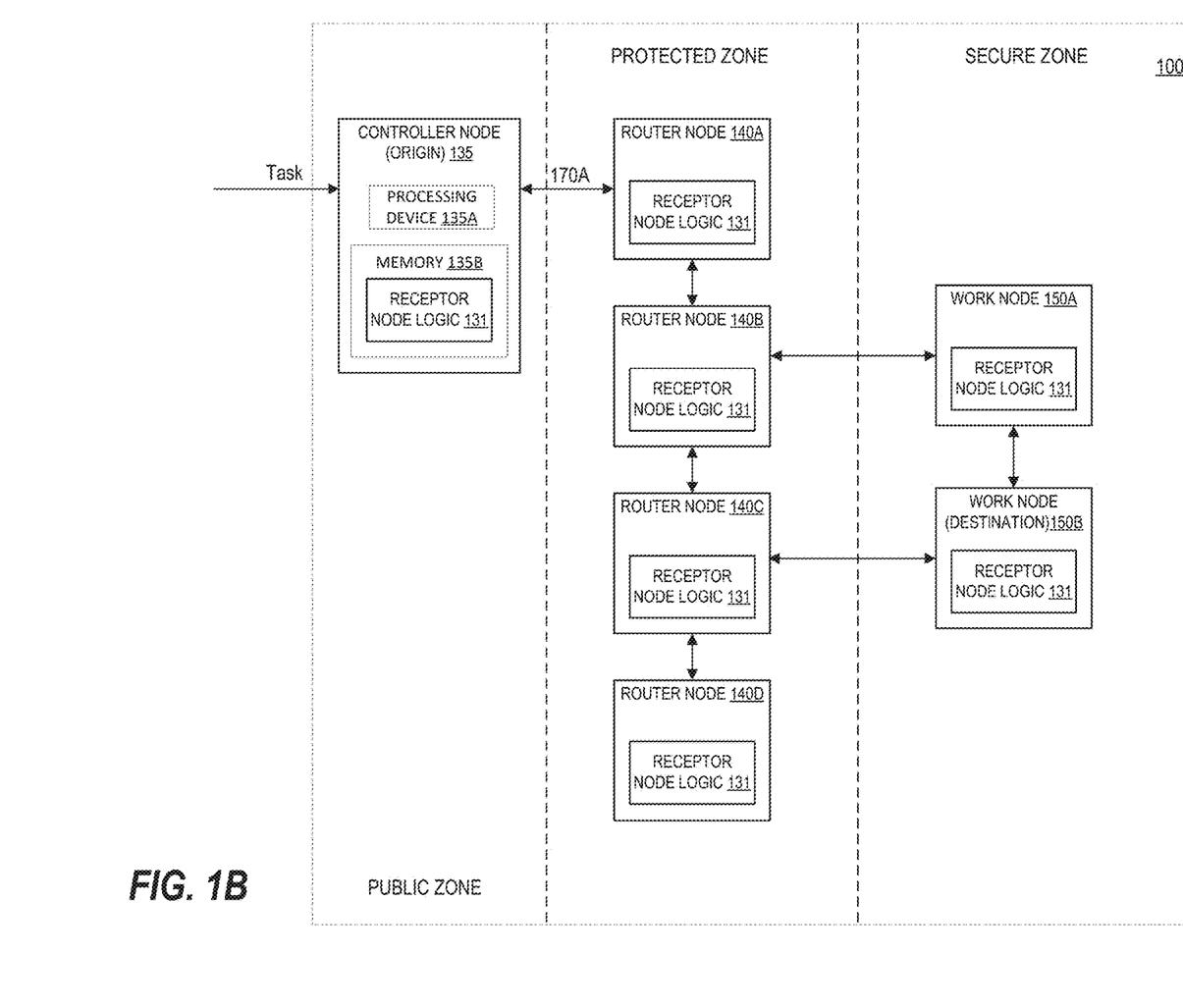
FIG. 1B is a block diagram illustrating an example of a receptor network, in accordance with some embodiments of the present disclosure.

FIG. 1B is a block diagram of the receptor network 100 in accordance with some embodiments of the present disclosure. As illustrated in FIG. 1B, receptor network 100 includes a controller node 135, a set of router nodes 140, and a set of work nodes 150. Although labeled as "controller node" or "router node" for ease of illustration, each node 135, 140, and 150 may be a receptor node 130 (illustrated in FIG. 1A) functioning as one or more of a controller node, router node, and work node, as discussed above.

As discussed above, controller node 135 may receive a message including a task to be performed (e.g., from service 110). Controller node 135 may determine a work node 150 that is the destination work node at which the task is to be performed. Controller node 135 may be referred to as the origin controller node, and may be implemented on a host computing device having a memory 135B and a processing device 135A. For example, service 110 may send a message including a task that is an automation request to install a web server on a work node 150. Controller node 135 may examine the task data as well as the advertisements of plugin capability received from each plugin of each work node 150 (as discussed above) and determine a work node 150 or group of work nodes 150 that can perform the task. Controller node 135 may identify this work node as the destination work node. If controller node 135 has determined a group of work nodes 150 that may perform the task, it may transmit the message to the work node 150 that can be reached in the shortest amount of time (as determined by intermediate routing nodes 140 as discussed further herein). In the example of FIG. 1B, controller node 135 may determine that work node 150B is the destination work node. Because work node 150B is in the secure zone, controller node 135 may not be able to communicate directly with it, and may thus begin determining a first hop on an optimal path to the work node 150B, The controller node 135 (as well as all other nodes) may understand the topology of the entire receptor network 100, and may determine a node that will be a first hop on an optimal path to the work node 150B. The controller node 135 may include a routing table indicating the node ID of every node in the receptor network 100 and utilize the routing table in order to determine the first hop on an optimal path to work node 150B. Controller node 135 may determine that router node 140A is the first hop, and transmit the task to router node 140A via bi-directional connection 170A. Connection 170A may be formed by router node 140A initiating a connection with controller node 135 (e.g., as directed to by its configuration file, which indicates controller node 135 as a peer node). As discussed above, router node 140A may directly connect to controller node 135 since it is located in the protected zone and can initiate a connection to a node in the public zone, while a node in the public zone cannot initiate a connection to the protected zone. Stated differently, router node 1401 may be the server for the connection 170A and controller node 135 may be the client for the connection 170A. Router node 140A may then determine the next hop on an optimal path to work node 150B. Router node 140A may determine that it does not have a direct connection to the secure zone, and may examine its routing table and determine that router node 140B does have a connection to the secure zone as well as a connection to router node 140C.

Thus router node 140A may determine that the next hop on the optimal path should be router node 140B and transmit the message to router node 140B. Router 140B may examine its routing table and determine that routing node 140C offers the optimal path to work node 150B. However, it may also determine that router node 140C is unavailable at the moment, and that work node 150A also offers a path to work node 150B. In some embodiments, router node 140B may elect to transmit the task to work node 150A. Work node 150A may function as both a work node and a router node (as discussed above) and may examine its routing table and transmit the task to the work node 150B. Work node 150A may directly connect to controller router node 140B since it is located in the secure zone and can initiate a connection to a node in the protected zone, while a node in the protected zone cannot initiate a connection to the secure zone. In some embodiments, upon determining that router node 140C is unavailable, router node 140B may elect to wait a certain period of time to see if router node 140C becomes available again. For example, router node 140B may determine the difference in time required to reach work node 150B by utilizing work node 150A and by utilizing router node 140C. Router node 140B may wait a time period equal to the difference before transmitting the task to work node 150A. As illustrated in the above described example, each individual node may determine what the next hop in an optimal path to a destination work node should be, as opposed to the controller node 135 determining the entire optimal path on its own. In this way, each receptor node can account for changes in the topology of the receptor network 100 such as sudden unavailability of a router node 140, or a link error between nodes.

Upon receiving the message with the task, work node 150B may inspect the message payload and determine a matching plugin that can perform the task. Work node 150B may start the plugin and provide the task data from the message to the plugin for execution. During execution of the task, work node 150B may deliver status indicators and ultimately the resulting output of execution of the task to the controller node 135 via the router nodes 140. Work node 150 may attempt to deliver the status indicators and resulting output using the same route that the message arrived on, but as discussed above each node may determine what the next hop in an optimal path to back to the controller node 135 should be. In this way, each node can account for changes in the topology of the receptor network 100 such as sudden unavailability of a router node 140, or a link error between nodes.

Figure 4:
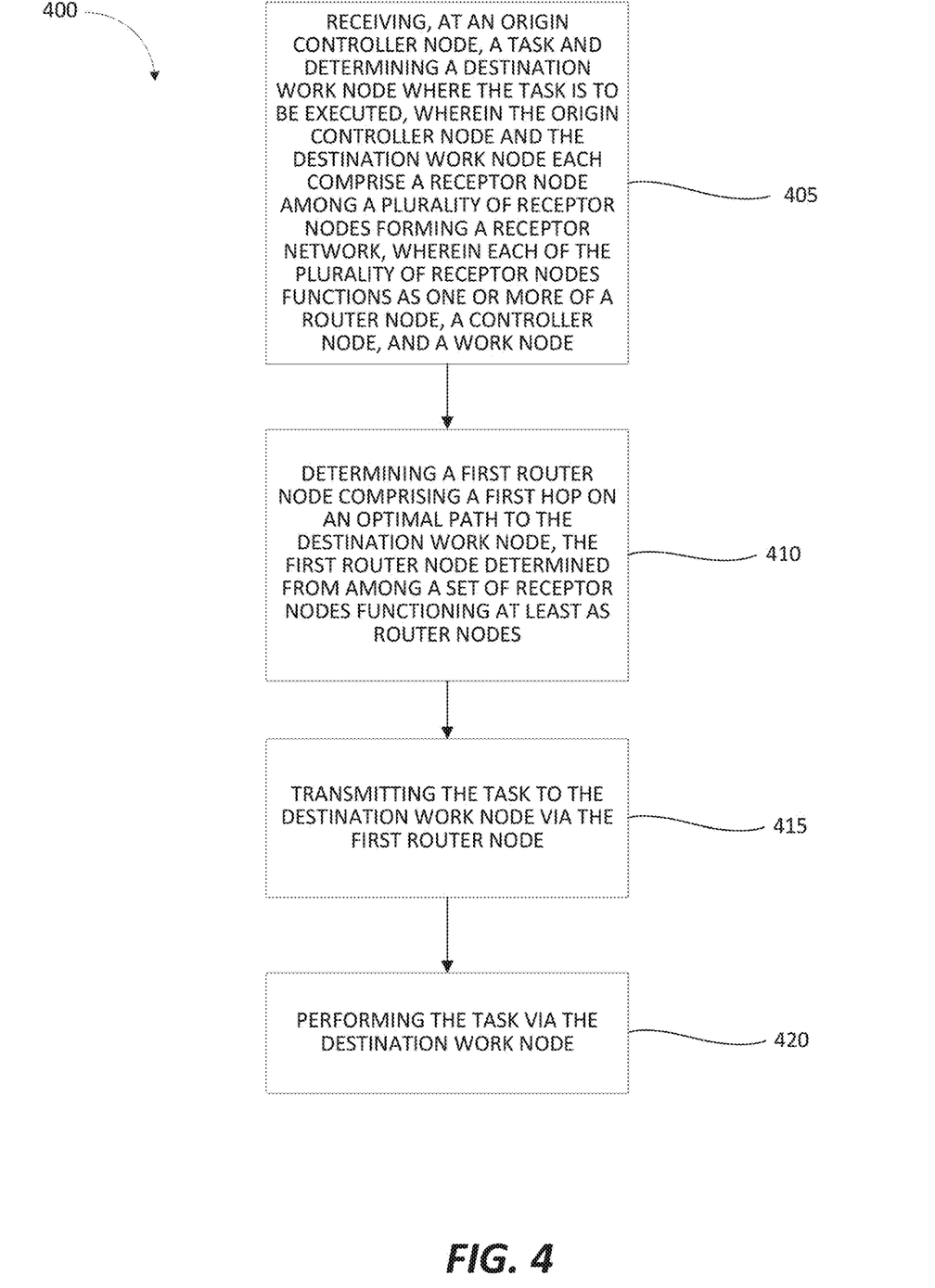
FIG. 4 is a flow diagram of an example method for routing a task from a service to a work node via a receptor network, in accordance with some embodiments of the present disclosure

FIG. 4 is a flow diagram illustrating a method 400 for utilizing a receptor network to forward a task from an external service to a work node capable of executing the task, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by receptor nodes (e.g., as illustrated in FIGS. 1A and 1B).

At block 405, controller node 135 may receive a message including a task to be performed (e.g., from service 110). Controller node 135 may determine a work node 150 that is the destination work node at which the task is to be performed. Controller node 135 may be referred to as the origin controller node, and may be implemented on a host computing device having a memory 135B and a processing device 135A. For example, service 110 may send a message including a task that is an automation request to install a web server on a work node 150. Controller node 135 may examine the task data as well as the advertisements of plugin capability received from each plugin of each work node 150 (as discussed above) and determine a work node 150 or group of work nodes 150 that can perform the task. Controller node 135 may identify this work node as the destination work node. If controller node 135 has determined a group of work nodes 150 that may perform the task, it may transmit the message to the work node 150 that can be reached in the shortest amount of time (as determined by intermediate routing nodes 140 as discussed further herein). In the example of FIG. 1B, controller node 135 may determine that work node 150B is the destination work node.

At block 410, because work node 150B is in the secure zone, controller node 135 may not be able to communicate directly with it, and may thus begin determining a first hop on an optimal path to the work node 150B. The controller node 135 (as well as all other nodes) may understand the topology of the entire receptor network 100, and may determine a node that will be a first hop on an optimal path to the work node 150B. The controller node 135 may include a routing table indicating the node ID of every node in the receptor network 100 and utilize the routing table in order to determine the first hop on an optimal path to work node 150B. Controller node 135 may determine that router node 140A is the first hop, and at block 415, may transmit the task to the destination work node 150B via router node 140A. More specifically, controller node 135 may transmit the task to router node 140A via bi-directional connection 170A. Connection 170A may be formed by router node 140A initiating a connection with controller node 135 (e.g., as directed to by its configuration file, which indicates controller node 135 as a peer node). As discussed above, router node 140A may directly connect to controller node 135 since it is located in the protected zone and can initiate a connection to a node in the public zone, while a node in the public zone cannot initiate a connection to the protected zone. Stated differently, router node 140A may be the server for the connection 170A and controller node 135 may be the client for the connection 170A. Router node 140A may then determine the next hop on an optimal path to work node 150B, Router node 140A may determine that it does not have a direct connection to the secure zone, and may examine its routing table and determine that router node 140B does have a connection to the secure zone as well as a connection to router node 140C.

Thus router node 140A may determine that the next hop on the optimal path should be router node 140B and transmit the message to router node 140B. Router 140B may examine its routing table and determine that routing node 140C offers the optimal path to work node 150B. However, it may also determine that router node 140C is unavailable at the moment, and that work node 150A also offers a path to work node 150B, In some embodiments, router node 140B may elect to transmit the task to work node 150A. Work node 150A may function as both a work node and a router node (as discussed above) and may examine its routing table and transmit the task to the work node 150B. Work node 150A may directly connect to controller router node 140B since it is located in the secure zone and can initiate a connection to a node in the protected zone, while a node in the protected zone cannot initiate a connection to the secure zone. In some embodiments, upon determining that router node 140C is unavailable, router node 140B may elect to wait a certain period of time to see if router node 140C becomes available again. For example, router node 140B may determine the difference in time required to reach work node 150B by utilizing work node 150A and by utilizing router node 140C. Router node 140B may wait a time period equal to the difference before transmitting the task to work node 150A. As illustrated in the above described example, each individual node may determine what the next hop in an optimal path to a destination work node should be, as opposed to the controller node 135 determining the entire optimal path on its own. In this way, each receptor node can account for changes in the topology of the receptor network 100 such as sudden unavailability of a router node 140, or a link error between nodes.

At block 420, a plugin of the destination work node 150B may perform the task as discussed below with respect to FIG. 5.

Figure 5:
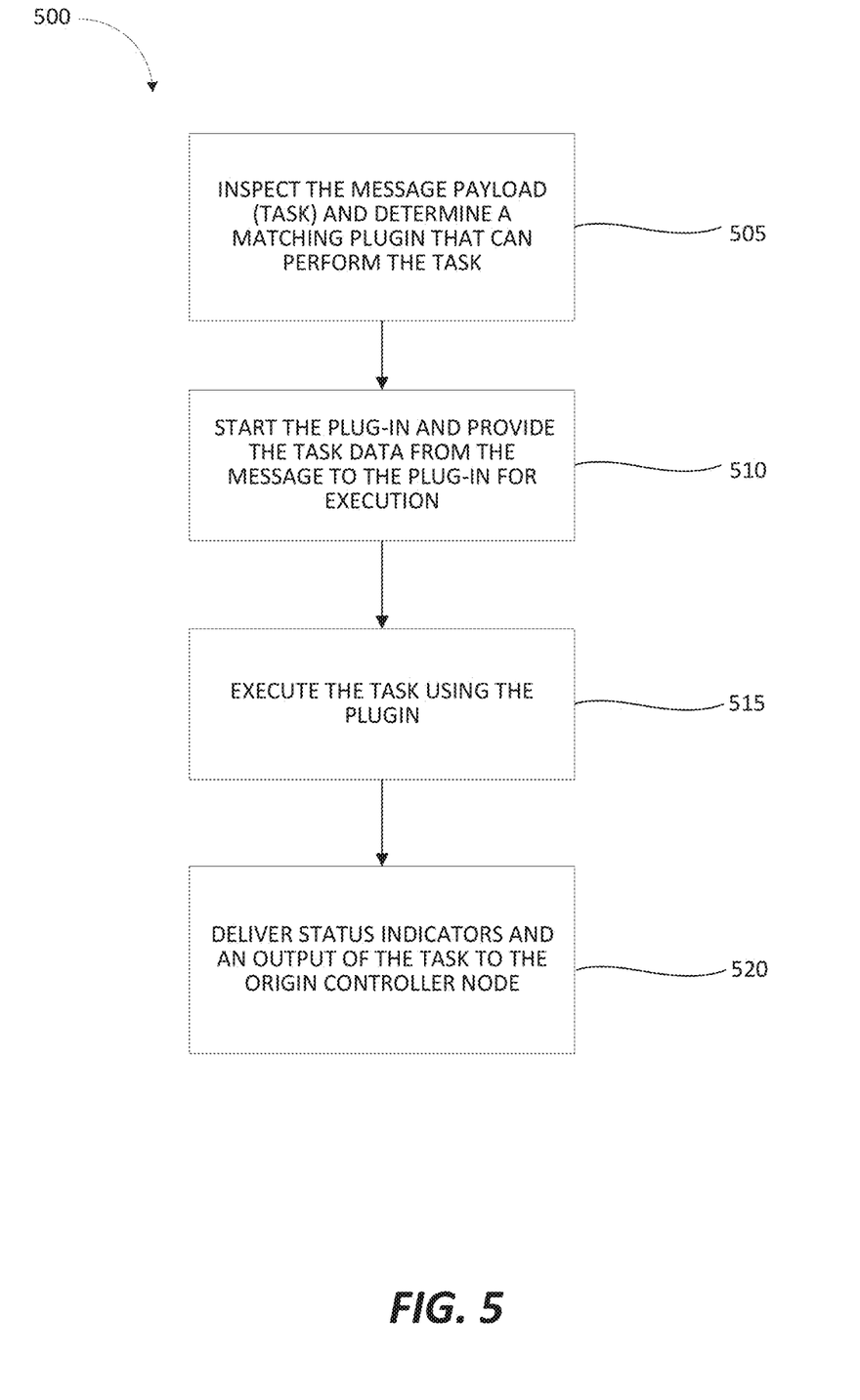
FIG. 5 is a flow diagram of an example method for performing a task, in accordance with some embodiments of the present disclosure

FIG. 5 is a flow diagram illustrating a method 500 for performing a task at a work node using a plugin, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a work node (e.g., work node 150B illustrated in FIG. 1B).

At block 505, upon receiving the message with the task, work node 150B may inspect the message payload and determine a matching plugin that can perform the task. At block 510, work node 150B may start the plugin and provide the task data from the message to the plugin for execution. At block 515, the plugin may execute the task. During execution of the task, at block 520, work node 150B may deliver status indicators and ultimately the resulting output of execution of the task to the controller node 135 via the router nodes 140. Work node 150 may attempt to deliver the status indicators and resulting output using the same optimal path (e.g., work node 150A, router node 140B, and router node 140A) that the message arrived on, but as discussed above each node may determine what the next hop in an optimal path to back to the controller node 135 should be. In this way, each node can account for changes in the topology of the receptor network 100 such as sudden unavailability of a router node 140, or a link error between nodes.

Figure 6:
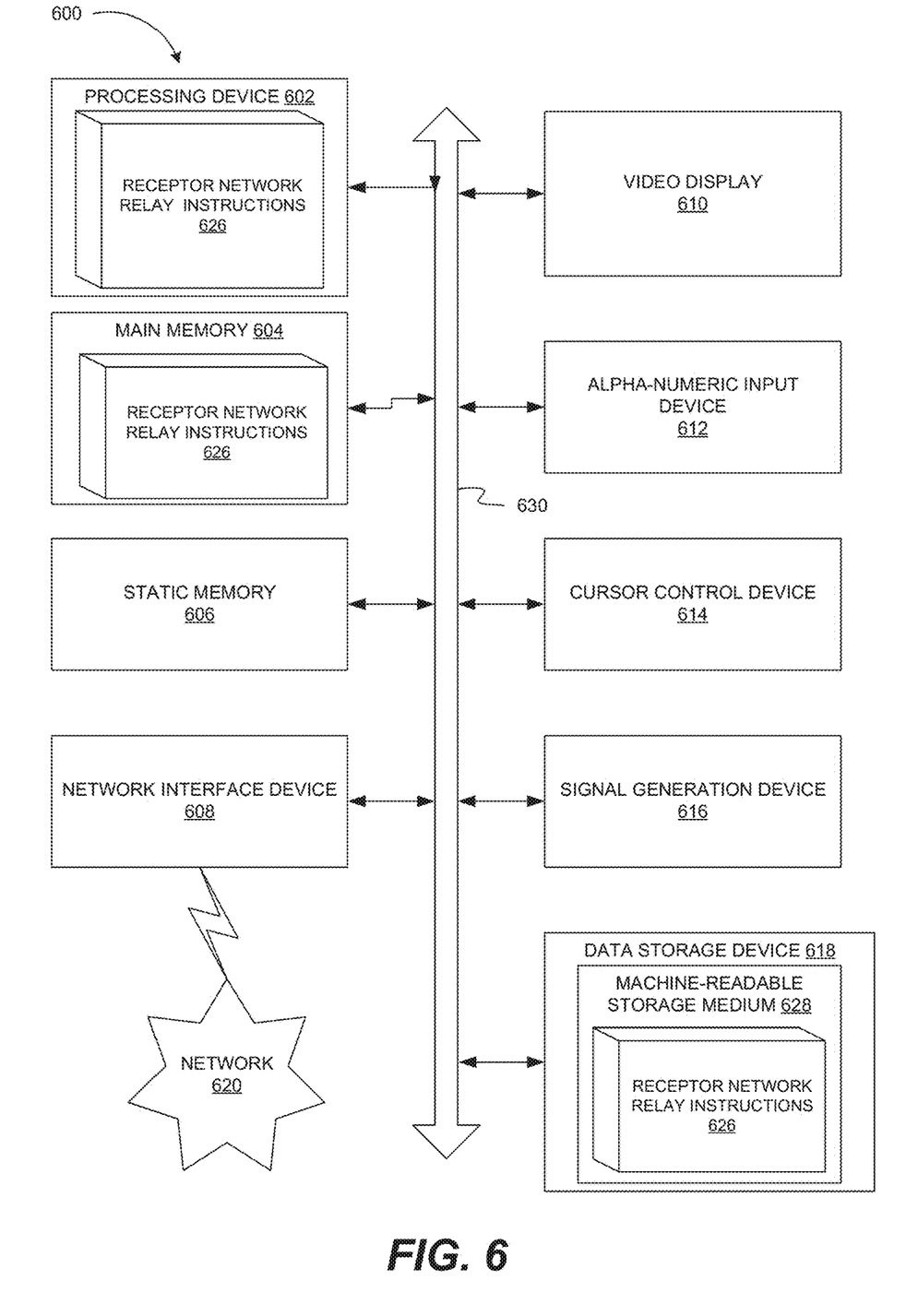
FIG. 6 is a diagram of an example computing device, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for determining a network topology. More specifically, the machine may implement a receptor network for forwarding a message bearing a task from an external service to a destination work node that can execute the task. The receptor network may comprise a plurality of receptor nodes that each may function as one or more of a router node, a controller node, and a work node. Each of the plurality of receptor nodes may be connected to one or more other receptor nodes via a bi-directional link. A task intended for a destination work node may be received (e.g., from an external service) at an origin controller node wherein the origin controller node and the destination work node each comprise a receptor node in the receptor network. A first router node comprising a first hop on an optimal path to the destination work node may be determined, the first router node determined from among a set of receptor nodes functioning at least as router nodes. The task may be transmitted to the destination work node via the first router node and the task may be performed by a plugin on the destination work node.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute network topology generation instructions 626, for performing the operations and steps discussed herein.

The data storage device 618 may include a machine-readable storage medium 628, on which is stored one or more sets of receptor network relay instructions 626 (e.g., software) embodying any one or more of the methodologies of functions described herein, including instructions to cause the processing device 602 to perform one or more of the actions described herein. The receptor network relay instructions 626 may also reside completely or at least partially, within the main memory 604 or within the processing device 602 during execution thereof by the computer system 600; the main memory 604 and the processing device 602 also constituting machine-readable storage media. The receptor network relay instructions 626 may further be transmitted or received over a network 620 via the network interface device 608.

The machine-readable storage medium 628 may also be used to store instructions to perform a method for object analysis/validation event publishing, as described herein. While the machine-readable storage medium 628 is shown in an exemplary embodiment to be a single medium; the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include; but is not limited to, magnetic storage medium floppy diskette); optical storage medium CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily, obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner. It should be understood that other operations may be performed in between described operations, described operations may be adjusted so that they occur at slightly different times or the described operations may be distributed in a system which allows the occurrence of the processing operations at various intervals associated with the processing.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate a array, or other unprogrammed device, unless accompanied by programmed media that confers the ability to the unprogrammed device to be configured to perform the disclosed function(s).

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   receiving, at a first receptor node configured as a controller node and a work node, a first task and determining, by the first receptor node, a destination work node where the first task is to be performed, wherein the first receptor node and the destination work node each comprise a receptor node among a plurality of receptor nodes forming a receptor network, and each of the plurality of receptor nodes functions as one or more of a router node, a controller node, and a work node and wherein the plurality of receptor nodes are distributed across a plurality of network components;
   determining, by a processing device, a first router node comprising a first hop on an optimal path to the destination work node;
   transmitting the first task to the destination work node via the first router node to enable the destination work node to perform the first task;
   receiving, at the first receptor node, a second task from a second receptor node configured as another controller node of the receptor network, wherein the second receptor node has designated the first receptor node as another destination work node where the second task is to be performed; and
   performing the second task via the first receptor node.

2. The method of claim 1, wherein each of the plurality of receptor nodes function as one or more of a router node, controller node, and a work node at least partially in view of a location in the receptor network of the receptor node, a number of plugins the receptor node comprises, a number of connections the receptor node has to other receptor nodes in the plurality, and a configuration file of the receptor node.

3. The method of claim 1, wherein transmitting the first task to the destination work node comprises:
   transmitting the first task to the first router node;
   determining, by the first router node, a second router node comprising a second hop on the optimal path to the destination work node; and
   transmitting the first task to the destination work node via the second router node.

4. The method of claim 1, wherein each of the plurality of receptor nodes comprises:
   a bi-directional connection with each of one or more other receptor nodes from the plurality of receptor nodes;
   a node identifier (ID); and
   a routing table comprising the node ID of one or more receptor nodes in the plurality of receptor nodes.

5. The method of claim 1, wherein performing the first task comprises:
   matching the first task to a plugin on the destination work node and initiating the plugin;
   transmitting data of the task to the plugin;
   executing the first task using the plugin to generate an output; and
   transmitting status indicators and the output to the origin controller node.

6. The method of claim 4, wherein each bi-directional connection between receptor nodes in the plurality of receptor nodes comprises a raw socket connection.

7. The method of claim 1, wherein determining a destination work node comprises determining a work node comprising a plugin for executing the first task.

8. A system comprising:
   a first receptor node configured as a controller node and a work node, the first receptor node comprising:
   a memory; and
   a processing device operatively coupled to the memory, the processing device to:
   receive a first task and determine a destination work node where the first task is to be performed, wherein the first receptor node and the destination work node each comprise a receptor node among a plurality of receptor nodes forming a receptor network, and each of the plurality of receptor nodes functions as one or more of a router node, a controller node, and a work node and wherein the plurality of receptor nodes are distributed across a plurality of network components;

determine a first router node comprising a first hop on an optimal path to the destination work node;

transmit the first task to the destination work node via the first router node to enable the destination work node to perform the first task;

receive a second task from a second receptor node configured as another controller node of the receptor network, wherein the second receptor node has designated the first receptor node as another destination work node where the second task is to be performed; and perform the second task.

9. The system of claim 8, wherein each of the plurality of receptor nodes function as one or more of a router node, controller node, and a work node at least partially in view of a location in the receptor network of the receptor node, a number of plugins the receptor node comprises, a number of connections the receptor node has to other receptor nodes in the plurality, and a configuration file of the receptor node.

10. The system of claim 8, wherein to transmit the first task to the destination work node, the processing device is to:

transmit the first task to the first router node;

determine, by the first router node, a second router node comprising a second hop on the optimal path to the destination work node; and transmit the first task to the destination work node via the second router node.

11. The system of claim 8, wherein each of the plurality of receptor nodes comprises:

a bi-directional connection with each of one or more other receptor nodes from the plurality of receptor nodes;

a node identifier (ID); and a routing table comprising the node ID of one or more receptor nodes in the plurality of receptor nodes.

12. The system of claim 8, wherein to perform the second task, the processing device is to:

match the second task to a plugin on the first receptor node and initiating the plugin;

transmit data of the second task to the plugin;

execute the second task using the plugin to generate an output; and transmit status indicators and the output to the second receptor node.

13. The system of claim 11, wherein each bi-directional connection between receptor nodes in the plurality of receptor nodes comprises a raw socket connection.

14. The system of claim 8, wherein to determine a destination work node, the processing device is to determine a work node comprising a plugin for executing the task.

15. A non-transitory computer-readable storage medium including instructions that, when executed by a processing device, cause the processing device to:

receive a first task and determine a destination work node where the first task is to be performed, wherein the destination work node comprises a receptor node among a plurality of receptor nodes forming a receptor network, and each of the plurality of receptor nodes functions as one or more of a router node, a controller node, and a work node and wherein the plurality of receptor nodes are distributed across a plurality of network components;

determine, by the processing device, a first router node comprising a first hop on an optimal path to the destination work node;

transmit the task to the destination work node via the first router node to enable the destination work node to perform the first task;

receive a second task from another receptor node configured as another controller node of the receptor network; and perform the second task.

16. The non-transitory computer-readable storage medium of claim 15, wherein each of the plurality of receptor nodes function as one or more of a router node, controller node, and a work node at least partially in view of a location in the receptor network of the receptor node, a number of plugins the receptor node comprises, a number of connections the receptor node has to other receptor nodes in the plurality, and a configuration file of the receptor node.

17. The non-transitory computer-readable storage medium of claim 15, wherein to transmit the task to the destination work node, the processing device is to:

transmit the first task to the first router node;

determine, by the first router node, a second router node comprising a second hop on the optimal path to the destination work node; and transmit the first task to the destination work node via the second router node.

18. The non-transitory computer-readable storage medium of claim 15, wherein each of the plurality of receptor nodes comprises:

a bi-directional connection with one or more other receptor nodes from the plurality of receptor nodes;

a node identifier (ID); and a routing table comprising the node ID of one or more receptor nodes in the plurality of receptor nodes.

19. The non-transitory computer-readable storage medium of claim 15, wherein to perform the task, the processing device is to:

match the second task to a plugin on and initiate the plugin;

transmit data of the second task to the plugin;

execute the second task using the plugin to generate an output; and transmit status indicators and the output to the another receptor node.

20. The system of claim 18, wherein each bi-directional connection between receptor nodes in the plurality of receptor nodes comprises a raw socket connection.

* * * * *